May 11, 1937.  F. A. B. FINKELDEY  2,079,796
METHOD OF MAKING HIGH SILICA CEMENT
Filed June 21, 1935
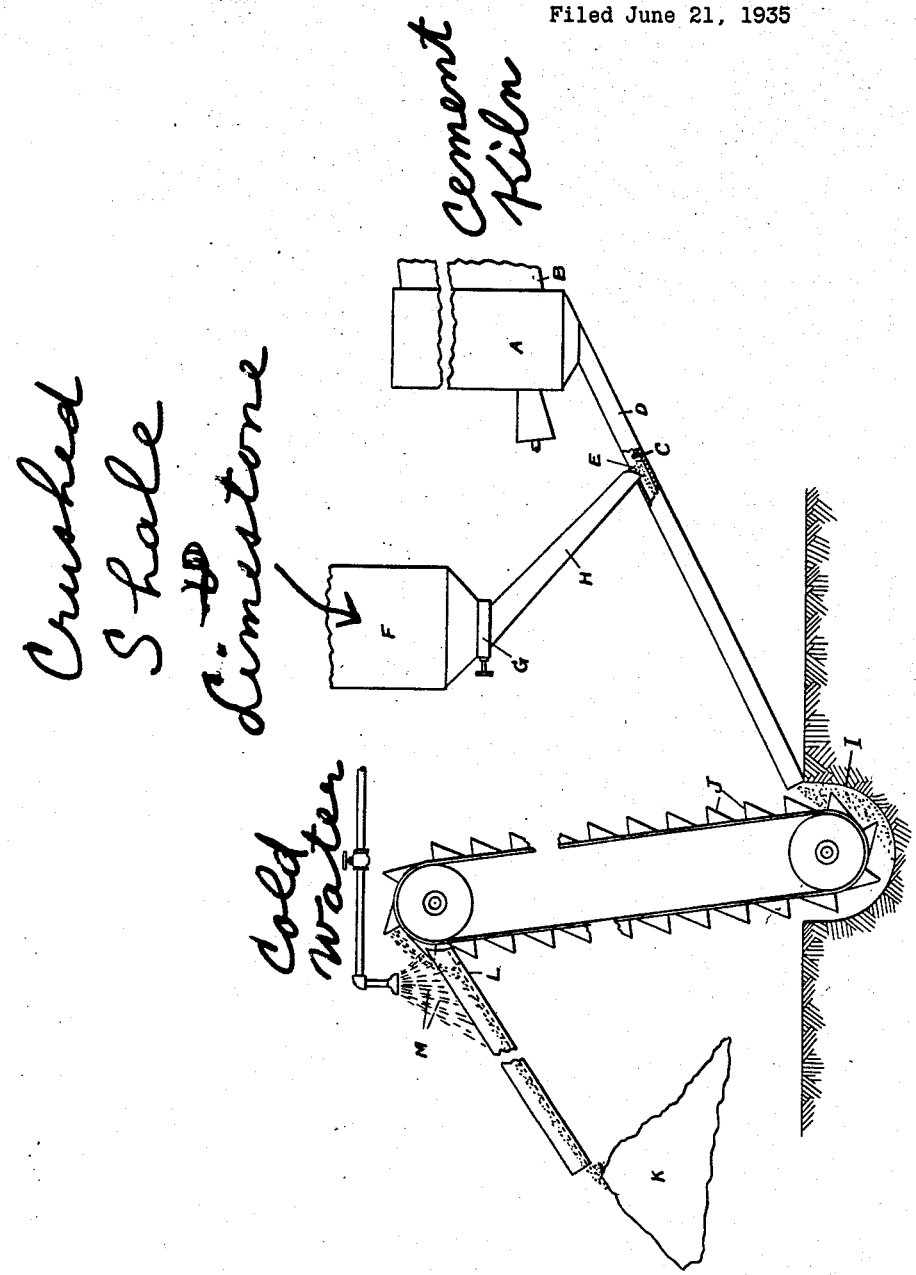
INVENTOR
*Fritz A. B. Finkeldey*
BY
*Miller Boyken & Bried*
ATTORNEY

106. COMPOSITIONS, COATING OR PLASTIC.

Patented May 11, 1937

2,079,796

UNITED STATES PATENT OFFICE 2,079,796

METHOD OF MAKING HIGH SILICA CEMENT

Fritz A. B. Finkeldey, Santa Cruz, Calif.

Application June 21, 1935, Serial No. 27,651

5 Claims. (Cl. 106—25)

This invention relates to the type of Portland cement which includes an activated siliceous additive ground therewith in order to satisfy the free lime developed during the final hydration of the cement during the setting of concrete made therewith, such for instance as disclosed in the Rice Patent No. 1,907,003 of May 2, 1933, and the object of the present invention is to provide an improved process of manufacturing such cements whereby the cost of production is reduced, and the cement is more uniform in its quality, the concrete product is stronger, and danger of unsoundness is eliminated. Other advantages of the process will appear in the following description and accompanying drawing.

The present case represents a continuation in part of my copending application filed under Serial No. 708,071, now Patent No. 2,028,386, January 21, 1936, with slightly amplified specification, to cover the subject of claims drawn to the treatment as described therein but for siliceous material even without admixture with lime.

In the drawing the figure is a somewhat diagrammatic elevation of apparatus for carrying out my improved process.

Before describing the invention in detail, it may be stated that the cement literature and many prior patents show it to be old to add siliceous materials such as puzzuolana, trass, volcanic ash, pumice, slag, diatomaceous earth, siliceous clays, shale, etc. to Portland cements as by mixing or grinding therewith or with the Portland cement clinker, so as to offer an acidic material to the free lime evolved in setting of concrete made of the cement to combine with it to form insoluble silicates of lime, etc. and thus render the concrete proof against the action of sea water and other lime-attacking agents. It was known that some forms of silica used had to be first activated by preliminary heating if the best results were to be expected. It was also known that a small quantity of lime added with the siliceous material was advantageous as an aid in starting the desired reaction.

The various patents issued on such cements were granted to the particular steps followed in preparing or incorporating the additive materials, such for instance as the limited water addition in the Wilner Patent No. 1,785,508 where shale and lime were calcined separately at relatively low temperatures, then mixed and finely ground, and agitated with a limited amount of water or steam introduced to hydrate the quicklime and perhaps initiate a slight reaction between the lime and shale, and the resulting dry powder formed a cement itself or could be further ground with Portland cement clinker to make a modified cement. In other processes hydrated lime was used.

My improved process secures the desired advantages of such additions to Portland cement to form a high-silica sea water resisting cement, but is carried out in a different manner and at much greater economy of manufacture effected by utilizing the otherwise waste heat of the Portland cement clinker as it emerges from the kiln to both activate the shale or other siliceous addition, as well as burn limestone to produce a small amount of CaO throughout the mass, while simultaneously cooling the clinker somewhat in contact with the crushed solid additive materials mixed directly therewith, then spraying the mixed mass of clinker and additives while still hot with cool water as it passes to the storage piles or further cooling step, to thereby hydrate the CaO while at the same time quenching the additive material and clinker and dropping its temperature from almost red heat to a point of stabilization, preferably down to about 300° C.

This process I have found to produce a more highly activated siliceous additive, also one which is softer or more friable and will grind much easier, also, when using a mixture of siliceous and calcareous materials, insure freedom from any unslaked lime to cause unsoundness in the cement, and at the same time yield a lighter color to the clinker and result in a cement of increased strength.

In carrying out the process I may use any suitable apparatus, as for instance that of the accompanying drawing wherein A is the discharge end of a rotary cement kiln B, the red hot Portland cement clinker C of which, just leaving the kiln, runs down a chute D, preferably covered, while shale, or shale and limestone E (crushed to about ⅛th of an inch and smaller, so as to pass through a screen of from 4 to 10 wires per inch) in the desired proportions, is fed from a suitable bin F or other source of supply through a suitable controlling gate G or poidometer and chute H directly upon the red hot clinker C to roll down the chute D with it so as to be thoroughly mixed therewith and drop into the elevator boot I from where it is picked up by a bucket elevator J and carried upward for delivery to the storage piles K or air cooling racks.

The temperature of the clinker at the moment of leaving the kiln is greater than that of a red heat, and may be from about 900° to 1200° C., and to prevent undue chilling by the additive, the latter may be prewarmed to any extent desired.

The time of contact with the red hot clinker includes that in chute D, boot I and elevator J, thus maintaining the heat treatment for a total of perhaps ten to thirty minutes during which the additive material is subject to an effective heat ranging from about 700° to 1050° C. and gradually lower until the top of the slowly moving elevator is reached and the still very hot material is discharged from the elevator to a chute L to run to the storage pile, or cross conveyor (not shown) leading to the pile or piles or cooling racks or means. As the hot shale or mixed materials are discharged from the elevator I provide a spray of cool water M which serves two purposes: first, (if lime is present) to hydrate the CaO developed from the limestone content by the heat of the clinker, and, second, to quickly cool both the additive material such as shale, as well as the clinker.

This sudden water cooling carried out in the general manner indicated is one of the main features of the invention as it brings in the well-known advantages of water cooling of hot clinker with similar though hitherto unknown advantages in regard to the shale, whether or not mixed with lime or limestone, and which as previously stated is rendered more highly activated in its affinity for lime, as well as more friable and much more easily grindable into cement, and while I prefer to use the heat of the clinker for activating the shale it may be heated alone by any source of heat to the required temperature, say from about 700° to 1050° C. for from about 10 to 30 minutes, and then chilled with cool water.

The proportions of clay or siliceous material as well as lime or limestone to be added to Portland cement clinker for grinding therewith will depend, of course, on the analysis of these materials as well as of the clinker to which they are added, but with a normal Portland cement clinker and Monterey shale the preferred proportions would be such as to yield about 24% of calcined shale, and limestone to yield about 6% CaO in the finished combined materials.

The piled hot materials are of course thoroughly intermingled and so remain for some time before grinding, thus insuring a complete penetration of the moisture into all the lime particles (when the mixture contains lime) and a partial reaction to set up between the lime and activated silica particles. When sufficiently cooled the mixed materials are ground to cement fineness in the ordinary way, the usual proportion of gypsum generally being added to control the set.

Insofar as the increased activation of the siliceous matter by the heating to the temperatures given, followed by sudden chilling, is concerned, as this need not necessarily be carried out by placing upon the red hot clinker, since it may be otherwise heated before chilling, I therefore claim this broadly as it results in a more activated silica than heretofore obtainable.

Having thus described my invention, what I claim is:

1. In the manufacture of high-silica Portland-type cements by grinding of additional siliceous materials with finished Portland cement or clinker, the improvement which comprises heating natural siliceous material to a red heat to increase its activity to reaction with lime and suddenly chilling the hot material before adding it to the cement or clinker, and grinding therewith.

2. In the manufacture of high-silica Portland-type cements by grinding of additional siliceous materials with finished Portland cement or clinker, the improvement which comprises heating natural siliceous material to a red heat to increase its activity to reaction with lime and chilling the hot material with water, before adding it to the cement or clinker, and grinding therewith.

3. In the manufacture of high-silica Portland-type cements by grinding of additional siliceous materials with finished Portland cement or clinker, the improvement which comprises heating natural siliceous material to a red heat but below the point of incipient fusion to increase its activity to reaction with lime and chilling the hot material with water, before adding it to the cement or clinker, and grinding therewith.

4. In the manufacture of high-silica Portland-type cements by grinding of additional siliceous materials with finished Portland cement or clinker, the improvement which comprises heating natural siliceous material to a temperature of from about 700° to 1050° C., but below that of incipient fusion, maintaining the material at a high temperature for a period of time to secure the desired activity, and chilling the hot material with water, before adding it to the cement or clinker, and grinding therewith.

5. In the manufacture of high-silica Portland-type cements by grinding of additional siliceous materials with finished Portland cement or clinker, the improvement which comprises reducing natural siliceous material to a small state of division and heating it to a red heat but below the point of incipient fusion to increase its activity to reaction with lime and chilling the hot material with water, before adding it to the cement or clinker, and grinding therewith.

FRITZ A. B. FINKELDEY.